United States Patent [19]
Wasson et al.

[11] Patent Number: 6,163,091
[45] Date of Patent: Dec. 19, 2000

[54] LINEAR MOTOR WITH COMMUTATION COIL

[75] Inventors: Ken G. Wasson, Foster City; Andrew J. Hazelton, San Carlos, both of Calif.

[73] Assignee: Nikon Corporation, Japan

[21] Appl. No.: 09/347,369

[22] Filed: Jul. 6, 1999

[51] Int. Cl.⁷ .................................................. H02K 41/00
[52] U.S. Cl. ............................................. 310/12; 310/13
[58] Field of Search ........................ 310/12, 13; 335/229; 378/34

[56] References Cited

U.S. PATENT DOCUMENTS

| | | | |
|---|---|---|---|
| 4,318,038 | 3/1982 | Munehiro | 318/135 |
| 4,641,065 | 2/1987 | Shibuki et al. | 318/135 |
| 4,758,750 | 7/1988 | Itagaki et al. | 310/13 |
| 5,477,304 | 12/1995 | Nishi | 355/53 |
| 5,528,118 | 6/1996 | Lee | 318/568.17 |
| 5,661,446 | 8/1997 | Anderson et al. | 335/229 |
| 5,684,856 | 11/1997 | Itoh et al. | 378/34 |
| 5,715,037 | 2/1998 | Saiki et al. | 355/53 |
| 5,773,837 | 6/1998 | Nakasuji | 250/412.23 |
| 5,808,381 | 9/1998 | Aoyama et al. | 310/12 |

OTHER PUBLICATIONS

B. Brunelli et al., *T–Shaped Lim Driven By A Three–Phase PWM AC Chopper*, EPE Firenze 1991, pp. 1–492 through 1–499.

J.R. Hendershot, Jr., TJE Miller, *Design of Brushless Permanent–Magnet Motors*, (Motor and Controller Types), 1994, Page 2–31.

*Primary Examiner*—Nestor Ramirez
*Assistant Examiner*—Guillermo Perez
*Attorney, Agent, or Firm*—Skjerven Morrill MacPherson LLP; Norman R. Klivans; Gary J. Edwards

[57] ABSTRACT

A linear motor supplying a nearly constant force along its entire length is presented. The linear motor includes two parallel magnet arrays having magnet strips of alternating magnetic polarity positioned along the length of the motor. A three-phase commutation coil is attached to a center pole such that individual coils are wrapped around the center pole. In some embodiments, the center pole runs the length of the motor and the three-phase commutation coil slides on the center pole. In other embodiments, the center pole is attached to the coils. The three-phase commutation coil includes any number of sets of three coils, each coil in the set carrying one of the three phases of current. A driver supplies three phases of current to the three-phase commutation coil in response to the position of the three-phase commutation coil relative to the magnet arrays.

58 Claims, 9 Drawing Sheets

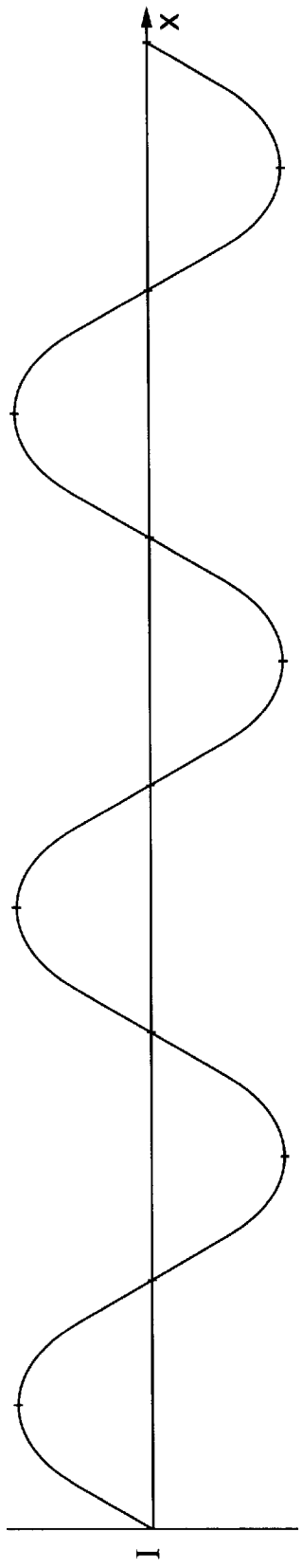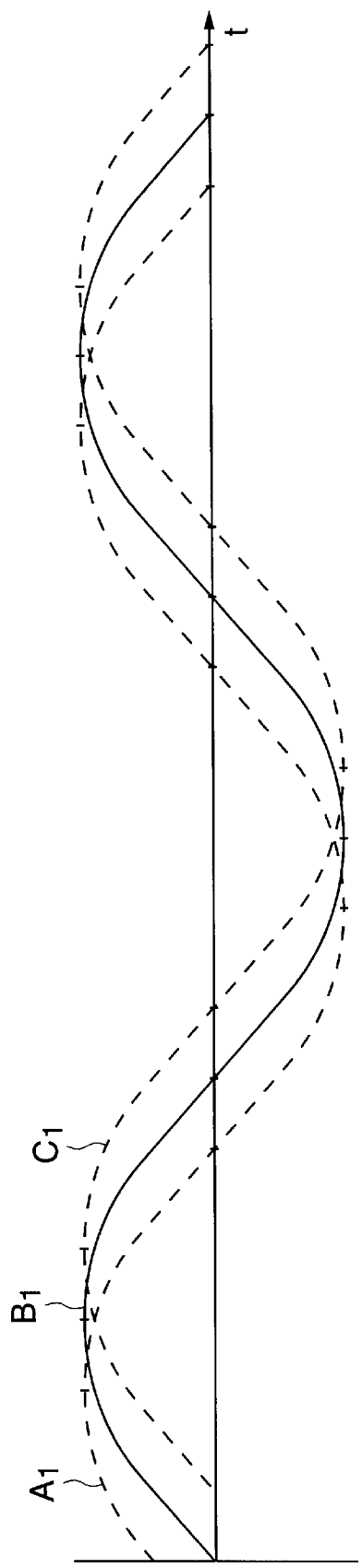
FIG. 6
FIG. 7

LINEAR MOTOR WITH COMMUTATION COIL

BACKGROUND

1. Field of the Invention

This invention relates to a center-pole type linear motor and, more particularly, to a center-pole type linear motor operating on three-phase AC current.

2. Prior Art

Linear motors are in general use in several technologies. In transportation technologies, for example, the magnetic levitation train, linear motors can be utilized as transportation vehicles. In other technologies, linear motors are employed to position printer heads, as variable position actuators and for linear positioning of other systems. Linear motors are commonly used, for example, in microlithographic instruments for positioning objects such as stages, and in other precision motion devices for precisely controlling the position of devices and instruments.

Linear motors are described in Hazelton et al., U.S. patent application Ser. No. 09/059056, "Linear Motor Having Polygonal Shaped Coil Units", filed Apr. 10, 1998, and assigned to the same assignee as the present disclosure, herein incorporated by reference in its entirety. A conventional linear motor includes a magnet array, which creates a magnetic field, and a coil array. The linear motor generates electromagnetic forces (called Lorentz forces) on the coil array in cooperation with the magnet array. The electromagnetic forces on the coil array cause the coil array to be propelled with respect to the magnet array. Conventional linear motors may incorporate a stationary magnet array (where the coil array is propelled) or a stationary coil array (where the magnet array is propelled). A translation stage is commonly attached to the coil array so that the translation stage, and therefore any object that is attached to the translation stage is propelled by the linear motor.

A conventional moving coil type linear motor comprises permanent magnets disposed on both sides of a moveable coil. Typically, the permanent magnets are permanently fixed on the inside surfaces of two rails, i.e., the surface of each rail that is directed towards the other rail. The coil array is typically mechanically coupled to a carriage (or translation stage) that is slideably engaged with a set of rails, which can be the two side rails or some other set of rails. The coils themselves are wound in a direction perpendicular to the magnetic fluxes of the magnetic field created by the permanent magnets. By externally generating currents in the coil array, the carriage will experience a Lorentz force and, consequently, will be propelled.

FIGS. 1A and 1B show respectively a plan and endview of a center-pole type linear motor 100 having two side rails 101 and 102. Side rails 101 and 102 are parallel plates of magnetic material that run the length of linear motor 100. End rails 103 and 104 are engaged with side rails 101 and 102 at both ends of linear motor 100. A base plate 113 (FIG. 1B) is attached to side rails 101 and 102 to form a "U" shaped yoke 111. Two permanent magnets 105 and 106 are mounted on the inside walls of side rails 101 and 102. Magnets 105 and 106 are magnetized along their thicknesses and mounted with the same polarity against the inside walls of yokes 101 and 102 (e.g., with the south pole directed towards the yoke as shown in FIG. 1A). A center pole 107 is mounted in air gap 114 between magnets 105 and 106 and runs parallel to side rails 101 and 102 through the length of linear motor 100. A coil bobbin 108 is attached to a carriage 112 (FIG. 1B) and displaced around center pole 107. Coils 109 and 110 are wound around coil bobbin 108 in a direction perpendicular to the line of travel of coil bobbin 108 (i.e., along the length of linear motor 100). Alternatively, flat coils may be wound in a direction parallel to the line of travel of coil bobbin 108 and fastened to coil bobbin 108 in such a fashion as to intersect the flux lines between either of magnets 105 and 106 and center pole 107. Flat coils, however, are problematic in that they have a larger percentage of inactive wire in comparison with coils wound around center pole 107. In either case, the principle that a current applied to the coils will cause the coils and their coil bobbin 108 (which is attached to carriage 112), to experience a force and, therefore, to move relative to the magnets, applies.

Base plate 113 is of non-magnetic material, such as 304 stainless steel, aluminum or ceramic. Side rails 101 and 102, end rails 103 and 104 and center pole 107 are of magnetic material (e.g., iron or steel) typically with saturation flux density equal to or greater than about 16,000 gauss. Permanent magnets 105 and 106 are, for example, of high quality neodymium iron boron (NdFeB) permanent magnet material with a residual permanent magnetic flux density of about 13,500 gauss or greater. Permanent magnets 105 and 106 are typically coated to prevent corrosion.

Linear motor 100 shown in FIGS. 1A and 1B has several deficiencies, including that the concentration of magnetic flux in end rails 103 and 104 and at the ends of center pole 107 causes magnetic saturation of those materials or, if more material is used to accommodate higher magnetic fluxes, causes linear motor 100 to become massive. In addition, the force felt by coil bobbin 108 in response to a given input current varies as coil bobbin 108 travels through linear motor 100. As a result, centerpole-type linear motors of this type suffer from a limited range of motion and a varying force over the range of motion. The only way to increase the range of motion of the linear motor is to increase the length of permanent magnets 105 and 106, which is not easily achievable.

FIG. 2 shows in a plan view a linear motor 200 similar to that described in U.S. Pat. No. 4,318,038, "Moving-Coil Linear Motor", issued to Hidehiko Munehiro on Mar. 2, 1982. In linear motor 200, side rails 201 and 202 are parallel plates that run the length of linear motor 200. End rails 203 and 204 are engaged with side rails 201 and 202 at both ends of linear motor 200. A bottom plate (not shown) is attached to side rails 201 and 202 to form a "U" shaped yoke. Center pole 207 is a parallel plate that runs, in parallel with side rails 201 and 202, the length of motor 200. Two (2) coils, coil 209 and coil 210, are mounted on a bobbin 208 that is slideably attached to center pole 207. Coils 209 and 210 are wound in a direction perpendicular to the direction of travel of bobbin 208. Permanent magnet segments 205-1 through 205-N are mounted to the inside surface of side rail 201 (i.e., the side of yoke 201 towards center pole 207) and magnet segments 206-1 through 206-N are mounted to the inside surface of yoke 202. Magnet segments 205-1 through 205-N and 206-1 through 206-N are individual magnets having alternating polarities and width approximately equal to twice the length of each of coils 209 and 210. The effect of including permanent magnet strips having alternating polarity is that the magnetic material in center pole 207, end rails 203 and 204 and side rails 201 and 202 are not so easily saturated.

However, coils 209 and 210 are actuated in a full on or full off fashion and therefore suffer from a non-constant force. This form of commutation results in a non-constant force along the length of motor 200.

It is desirable to have a linear motor that is extendible to any length without suffering magnetic saturation in the materials. In addition, it is desirable to have a linear motor capable of applying, to a moving stage, a substantially constant force along its entire length.

SUMMARY

In accordance with the present invention, a center-pole type moving coil linear motor is presented. The linear motor includes two parallel side rails along the length of the motor and a center pole mounted midway between the two parallel side rails. A magnet array is attached to each of the inside surfaces of the two parallel side rails. The magnet array includes a series of adjacent magnetic strips arranged along their width and magnetized along their thicknesses. Adjacent magnet strips in the magnet array have alternating polarities. The magnet array attached to one of the side rails is arranged with the magnet array attached to the other side rail so that complementary magnet strips have the same polarity, i.e., the same magnetic pole is directed towards the inside of the linear motor in magnetic strips that face each other.

A three-phase commutation coil is slideably mounted on the center pole so that it can travel the length of the linear motor. A flange (or translation stage) is also attached to the coils so that the translation stage is propelled, along with the three-phase commutation coil, by the linear motor. The three-phase commutation coil includes any number of sets of three coils, each of the three coils being supplied with one phase of three-phase A-C current. In one embodiment, for example, a linear motor includes ten (10) sets of three coils, or thirty coils in total.

Each set of three coils in the three-phase commutation coil is coupled to a driver that supplies current to the coils in response to the position of the three-phase commutation coil with respect to the permanent magnet array. Each coil is supplied with a corresponding phase of current from the driver. For example, in one set of three coils a first coil can be supplied with sinusoidal current of phase A, a second coil can be supplied with sinusoidal current of phase B, and a third coil can be supplied with sinusoidal current of phase C. As is conventionally known, the phase shifts of phases A, B and C total 360°. In most embodiments, phases A, B and C are separated from each other by a 120° phase shift.

In one embodiment of the invention, the length of the set of three coils is less than or equal to the width of one of the magnet strips in the magnet array. The period of the periodic current supplied to the three-phase commutation coil corresponds to the period of the magnetic field created by the alternating permanent magnet strips. In one embodiment, each set of three coils is separated by a distance equal to the width of two magnet strips and the current is the same through adjacent sets of three coils. In another embodiment, each set of three coils spans a width less than one magnet strip. The sets of three coils are separated by one magnet strip and the current supplied to alternate sets of three coils is reversed with respect to adjacent coils (i.e., any set of three coils is supplied with currents that are opposite the currents supplied to the corresponding coils in adjacent sets of three coils).

The width of the magnet strip refers to the physical dimension of the magnet strip along the length of the motor. The pitch of the magnet refers to the periodicity of the strips of magnet, i.e., the periodicity of the magnetic field. In most embodiments, the pitch of the magnet is twice the width of each individual magnet strip. The thickness of the magnet strip refers to the physical dimension of the magnet strip in a direction perpendicular to the length of the motor and towards the inside of the motor (i.e., towards the center pole).

Other embodiments can include other arrangements of sets of three coils and permanent magnets and can be driven by currents that vary with position in a way other than sinusoidally. For example, a triangular shaped periodic function may be realized.

In one embodiment, a translation stage is slideably attached to two parallel side rails or to guide rails suspended above the motor and the three-phase commutation coils are wrapped around and firmly attached to a center pole which extends beyond the extent of the coils. The center pole, then, is translated along with the three-phase commutation coils. In this embodiment, the material of the center pole should be chosen for low magnetic losses. In addition, the center pole material should extend from the three-phase commutation coils by at least one half-pitch of the magnet (i.e., the width of one magnet strip in some embodiments).

In yet another embodiment, the three-phase commutated coils are held stationary and the magnet array is propelled. In this embodiment, the translation stage is attached to the magnet array. In another embodiment, a linear motor includes a single side rail. The single side rail has a cross section which, for a cylindrically shaped motor, is circular. The cross section of the side rail can be any closed curve, including an ellipse a rectangle or a polygon. The linear motor also includes a magnet array having magnet strips that are shaped in conformity with the side rail and that are attached to the interior wall of the cylindrical side rail. The center pole of the linear motor is located in the interior of the side rail such that a translation stage and three-phase commutation coil that traverses the center pole can freely translate the length of the motor.

In yet another embodiment, the motor is curved so that the path of the translation stage describes a curve other than a straight line, e.g., an arc of a circle. In that embodiment, magnet strips on one side rail are wider than the corresponding magnet strips on the opposite side rail.

Linear motors according to the present invention avoid saturating the magnetic materials in the side rails, end rails and center pole by the use of alternating magnetic fields and a center pole that reverses the direction of the magnetic field. Additionally, coils wound around the center pole, as opposed to the use of flat coils, allow for better utilization of the coils. With three-phase commutation, the force exerted by the linear motor is very nearly a constant throughout the length of the motor.

The various embodiments of the invention are explained further below with reference to the following figures.

BRIEF DESCRIPTION OF THE FIGURES

FIG. 6 shows the current in one of the coils of the three-phase commutation coils as a function of displacement according to the present invention.

FIG. 7 shows the three-phase commutation as a function of position that is appropriate for the coils of the three-phase commutation coil.

In the figures, common identification of elements is employed where an element is identical between different figures.

DETAILED DESCRIPTION OF THE INVENTION

Figure 1A:
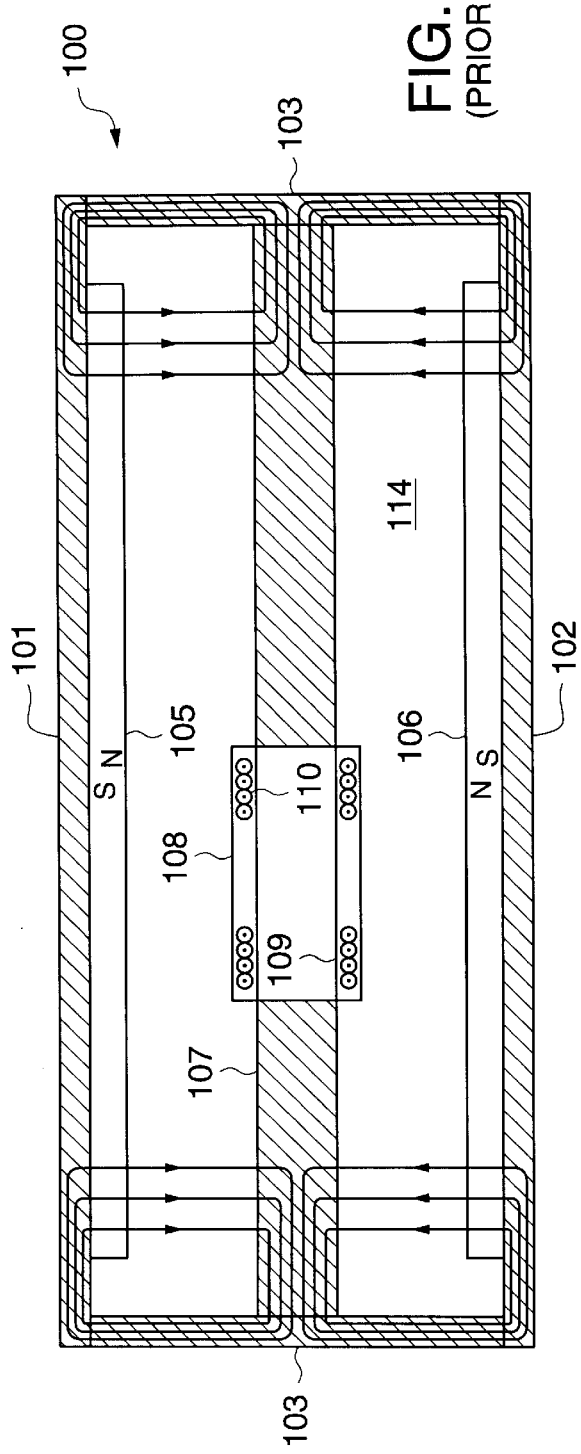
FIGS. 1A and 1B show a conventional center-pole type linear motor.
Figure 1B:
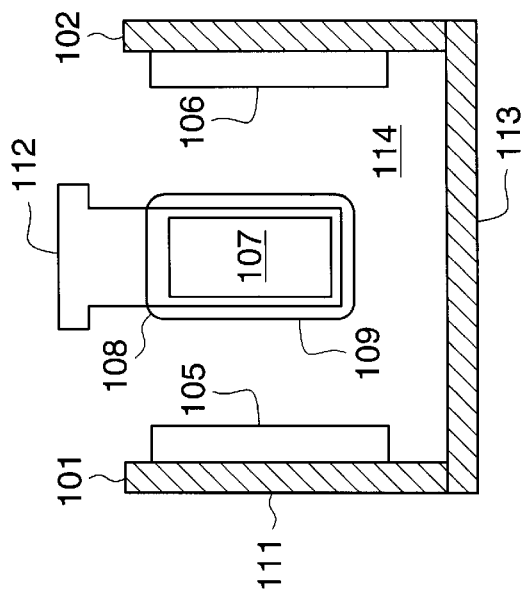
Figure 2:
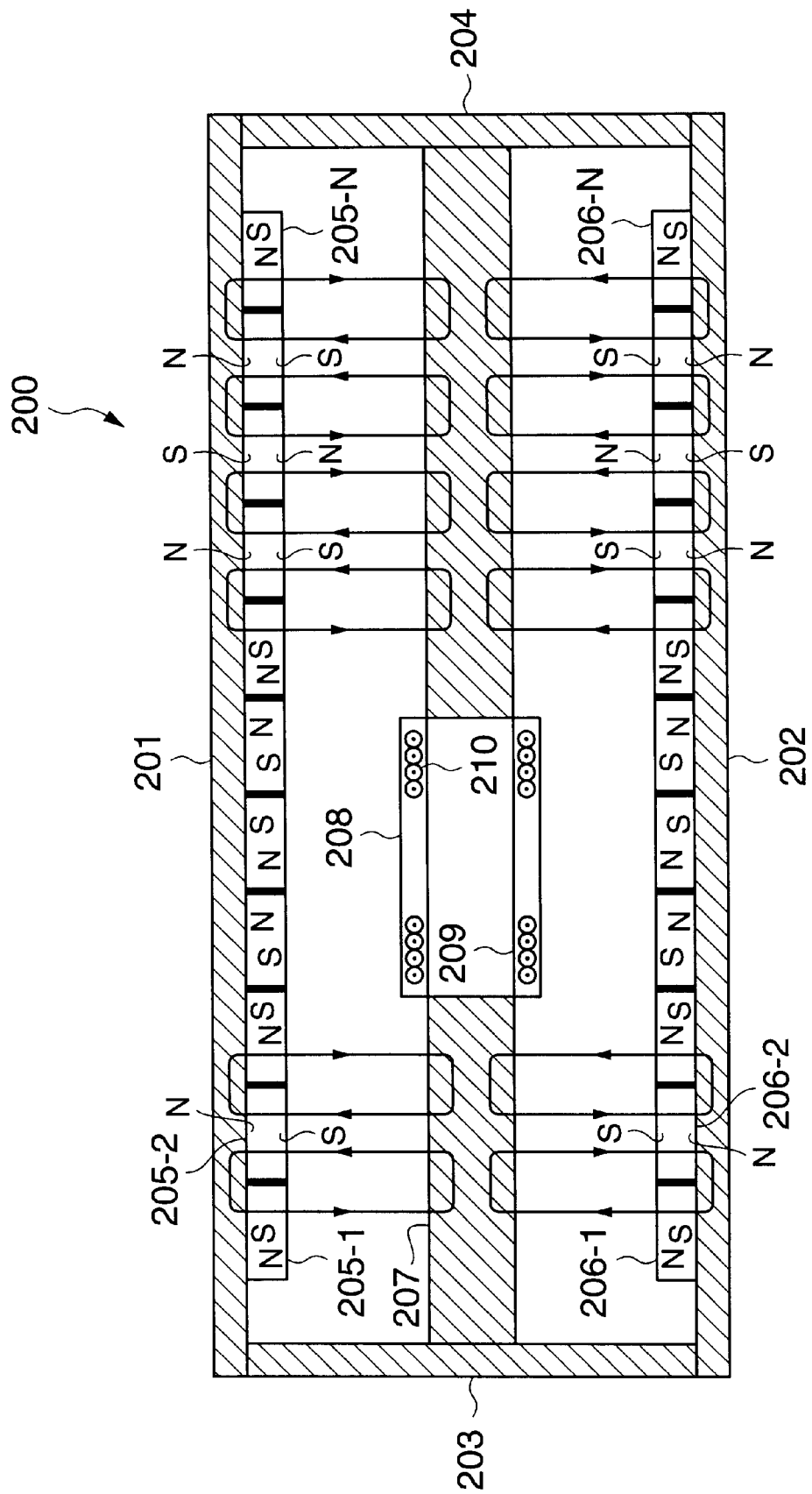
FIG. 2 shows a known linear motor having a magnet array with multiple magnet segments.
Figure 3:
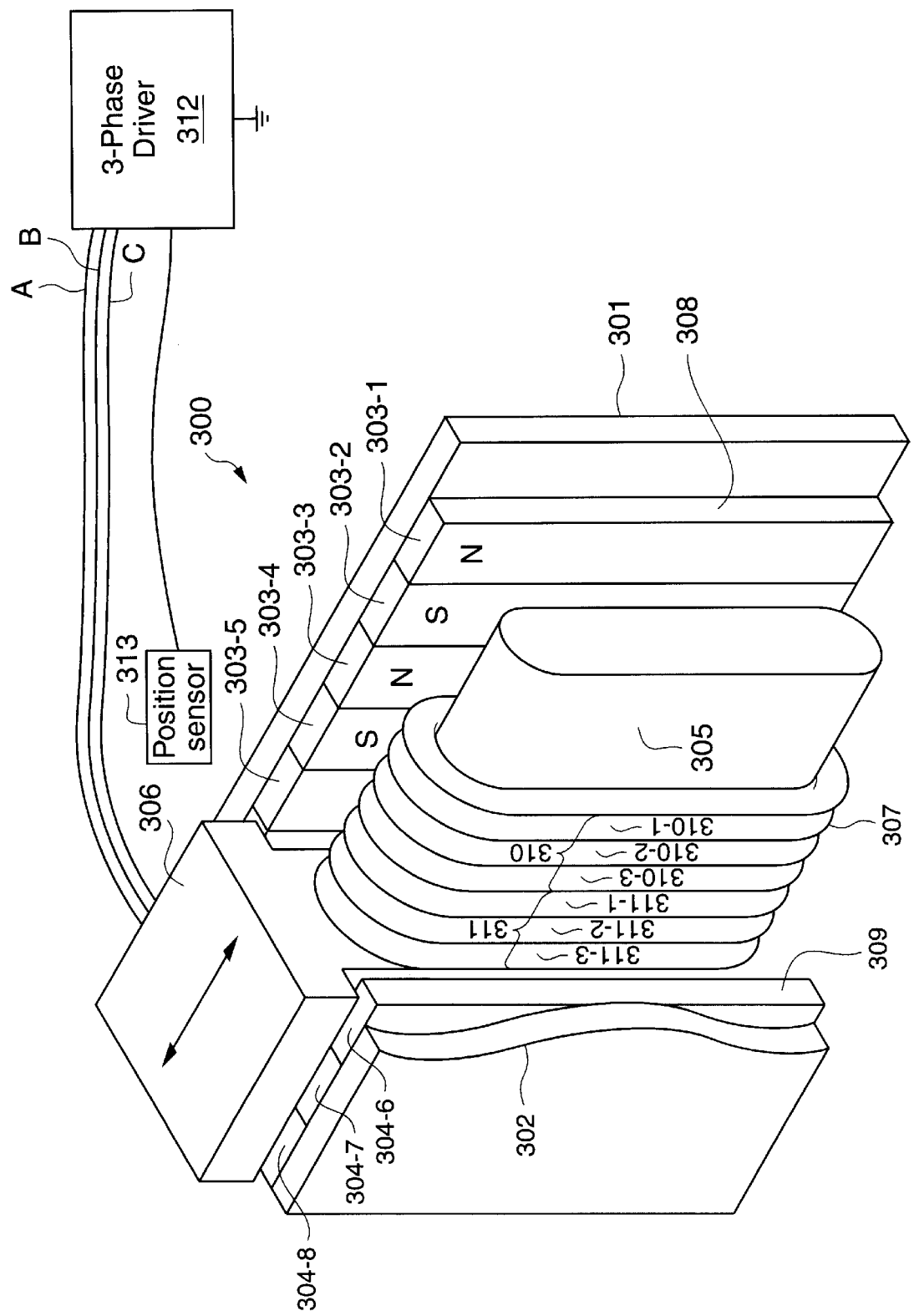
FIG. 3 shows a linear motor according to the present invention.

FIG. 3 shows a linear motor 300 according to the present invention. Side rails 301 and 302 are arranged to be parallel to one another and to run the length of linear motor 300. The length of linear motor 300 refers to the physical dimension of the motor along the direction of motion of moving components of the motor. Permanent magnet array 308 is mounted on the inside surface (i.e., towards the center of linear motor 300) of side rail 301 and permanent magnet array 309 is mounted to the inside surface of side rail 302. Permanent magnet arrays 308 and 309 include any number of permanent magnet strips 303 and 304, respectively. FIG. 3 shows permanent magnet strips 303 (strips 303-1 through 303-5 are shown) of permanent magnet array 308 and permanent magnet strips 304 (strips 304-6 through 304-8 are shown) of permanent magnet array 309. Alternating permanent magnet strips 303-1 through 303-5 are arranged to have alternating polarities. Therefore, permanent magnet strip 303-2 is shown having a south pole directed towards the inside of linear motor 300 while permanent magnet strips 303-1 and 303-3 both have a north pole directed towards the inside of linear motor 300. In addition, each of permanent magnet strips 304 is mounted opposite a corresponding one of permanent magnet strips 303 and has the same polarity (i.e., the same pole directed towards the interior of linear motor 300) as the corresponding one of permanent magnet strips 303. For example, permanent magnet strip 304-2 (not shown) is mounted opposite of permanent magnet strip 303-2 and is magnetized such that its south pole is directed towards the interior of linear motor 300.

Permanent magnet strips 303 and 304 are permanently magnetized strips magnetized in the direction of the thickness of the strip. The width of a permanent magnet strip refers to the dimension of the permanent magnet strip along the direction of motion of the motor. In most embodiments of the invention, each of the magnetic strips in permanent magnet strips 303 and 304 have substantially the same width. The pitch of permanent magnet strips 303 and 304 refers to the periodicity of the polarity of permanent magnet strips 303 and 304, which in most embodiments is twice the width of individual permanent magnet strips.

Permanent magnet strips can be formed from any permanent magnet material, such as neodymium iron boron (NdFeB). High quality NdFeB permanent magnet material can have a residual permanent magnetic flux density of about 13,500 gauss or greater. Permanent magnet strips 303 and 304 can be coated with a protective coating in order to prevent corrosion.

Permanent magnet strips 303 and 304 can be attached to side rails 301 and 302, respectively, in any fashion, including glue or epoxy. Additional mechanisms for attaching permanent magnet strips 303 and 304 to side rails 301 and 302, respectively, include mechanical clamping and magnetic attraction.

A center pole 305 is positioned between side rails 301 and 302. In one embodiment, center pole 305 runs the length of linear motor 300. Three-phase commutation coils 307, having at least one set of three commutation coils for three-phase commutation having A, B and C phases, are slideably attached to center pole 305 so that center pole 305 passes through the central axis of coils 307. Three-phase commutation coils 307 can include any number of three-coil sets for three-phase commutation. In FIG. 3, two three-coil sets 310 and 311 are shown. Three-coil set 310 includes coils 310-1, 310-2 and 310-3. Three-coil set 311 includes coils 311-1, 311-2 and 311-3. The length of a coil refers to the dimension of the coil along the length of linear motor 300, i.e., the direction of travel of linear motor 300.

Alternatively, flat coils may be wound in a direction parallel to center pole 305 and slidable fastened to center pole 305 in such a fashion as to intersect the flux lines between either of permanent magnet arrays 308 or 309 and center pole 305. Flat coils, however, are problematic in that they have a larger percentage of inactive wire in comparison with coils wound around center pole 305.

In one embodiment, a mounting flange 306 is attached to the top of three-phase commutation coils 307. In other embodiments, mounting flange 306 is slideably mounted to stationary iron core (center pole) 305 and three-phase commutation coils 307 are mounted to mounting flange 306. Mounting flange 306 can be a solid, non-magnetic flange. Mounting flange 306 can have a through-hole that passes stationary iron core 305 or can be attached to the top of three-phase commutation coils 307. Three-phase commutation coils 307 and mounting flange 306 are attached by any convenient method, including by gluing or epoxying the two together or by fastening them together by mechanical clamping or using fasteners. In yet another embodiment, mounting flange 306 can be attached to side rails 301 and 302.

In FIG. 3, mounting flange 306 is attached to the tops of three-phase commutation coils 307. Mounting flange 306 is slideably attached to slides on the top of magnet arrays 308 and 309 so that center pole 305 does not physically contact mounting flange 306 or three-phase commutation coils 307. Alternatively, mounting flange 306 can be slideably attached to guide rails (not shown).

In one embodiment, center pole 305 can be shortened (i.e. does not extend through the entire length of linear motor 300) and is attached to three-phase commutation coils and to mounting flange 306. In that case, center pole 305 is propelled in linear motor 300 along with mounting flange 306 and three-phase commutation coils 307. In this embodiment, center pole 305 extends from either side of coils 307 by at least a half-pitch.

Center pole 305 and side rails 301 and 302 are of magnetic materials such as iron or steel. In some embodiments, the saturation flux density of center pole 305 and side rails 301 and 302 should be equal to or greater than about 16,000 gauss. In embodiments where center pole 305 is attached to three-phase commutation coils 307 and mounting flange 306, then center-pole 305 can be laminated and chosen to be a low-loss material such as, for example, silicon steel, ferrite or stainless steel.

Center pole 305 allows the magnetic field to be reversed along the width of linear motor 300 (i.e., the direction from side rail 301 to side rail 302). Therefore, the axis of three-phase commutation coil 307 can be the same as the direction of travel, or the axis of linear motor 300. There is little change in the magnetic field in center pole 305 as the three-phase commutation coils 307 travel along center pole 305, therefore losses in center pole 305 due to changing magnetic fields is a minimum. In embodiments where center pole 305 travels with three-phase commutation coils 307, low-loss materials are needed because of the changing magnetic fields in center pole 305.

In FIG. 3, a three-phase driver 312 is electrically coupled to three-phase commutation coil 307. Driver 312 supplies current to each coil of three-phase commutation coil 307 in response to the position of mounting flange 306 as measured by position sensor 313. Position sensor 313 can be any device for determining the position of mounting flange 306 in motor 300, including mechanical sensors, optical sensing devices, Hall effect position sensors, optical encoders, magnetic encoders, resolvers, and laser interferometers. Driver 312 can be any of the well-known circuits for supplying three-phase current to motors. In some embodiments, driver 312 provides two sets of currents, one set of currents being of opposite polarity to the other so that adjacent sets of three coils are supplied with currents in opposite directions. In other embodiments, driver 312 provides one set of three currents which can be separated from each other by a phase shift of 120°. Examples of drivers such as three-phase driver 312 can be found in J. R. HENDERSHOT & TJE MILLER, DESIGN OF BRUSHLESS PERMANENT-MAGNET MOTORS (1994).

Figure 4:
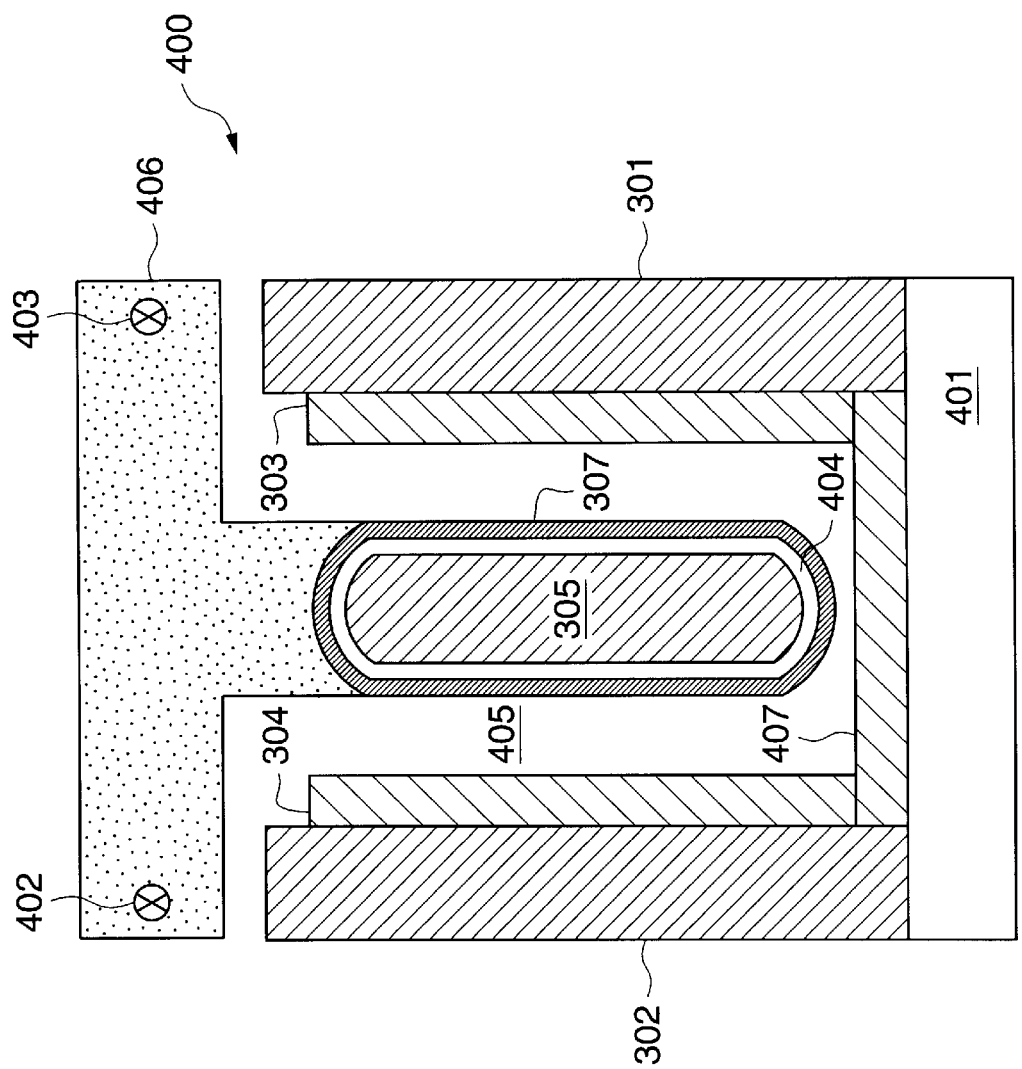
FIG. 4 shows a cross-sectional view of a linear motor according to the present invention.

FIG. 4 shows a cross-sectional view of a linear motor 400 according to the present invention. Linear motor 400 includes side rails 301 and 302. Permanent magnet strips 304 and 303, magnetized along their thicknesses, are mounted to side rails 301 and 302 such that they have the same pole directed towards the interior of the magnet, as was previously described. An air gap 405 is defined in the area between permanent magnet strips 304 and permanent magnet strips 303. Air gap 405 is decreased by the presence of center pole 305 and three-phase commutation coils 307. Center pole 305 is mounted between side rails 301 and 302 and, in one embodiment, runs the length of linear motor 400. Some embodiments include a bottom plate 401, constructed from a non-magnetic material such as 304 stainless steel, which is attached to side rails 301 and 302 to form a "U" shaped yoke for support purposes. Although in FIGS. 3 and 4, the shape of motors 300 and 400, respectively, is U-shaped (as defined by side rails 301 and 302), embodiments of linear motors according to this invention may have other shapes as well, including a generally cylindrical shape or a generally elliptical shape.

In FIG. 4, mounting flange 406 is mounted on top of three-phase commutation coils 307, as has been previously described. In other embodiments, mounting flange may completely surround center pole 305. Three-phase commutation coils 307 leave a small air-gap 404 between the coils and center pole 305. In this embodiment, three-phase commutation coils 307 and flange 406 travel along center pole 305. In other embodiments, center pole 305 may also be attached to three-phase commutation coils 307. Additionally, in some embodiments mounting flange 406 and three-phase commutation coils 307 remain spatially fixed and side rails 301 and 302, along with a translation stage mounted to them, are propelled by the force generated in motor 400.

In the embodiment of the invention shown in FIG. 4, mounting flange 406 is shown riding on guide rails 402 and 403, which are suspended above side rails 302 and 301, for support and therefore do not contact center pole 305, permanent magnets 303 and 304 or side rails 301 and 302. Mounting flange 306 of FIG. 3 is shown being supported on magnet arrays 308 and 309. In addition, the embodiment of linear motor 400 shown in FIG. 4 can also include bottom magnetic strips 407 that are magnetized along their thickness and have the same pole directed towards the inside of the motor as does permanent magnet strips 303 and 304. In addition, permanent magnet strip 407 is mounted adjacent to other permanent magnet strips along the length of linear motor 400 such that alternating strips have opposite magnetic poles directed towards the interior of the motor. In such embodiments, the bottom plate 401 can be made from magnetic material such as iron or steel.

In FIG. 4, mounting flange 406 can have any length (i.e., the dimension of mounting flange 406 along the length of linear motor 400). In embodiments where mounting flange 406 encloses center pole 305 and sets of three-phase commutation coils 307 are mounted on both sides of mounting flange 406, then the length of mounting flange 406 within linear motor 400 corresponds to an integer number of widths of individual magnet strips in permanent magnet strips 304 and 303.

Figure 5:
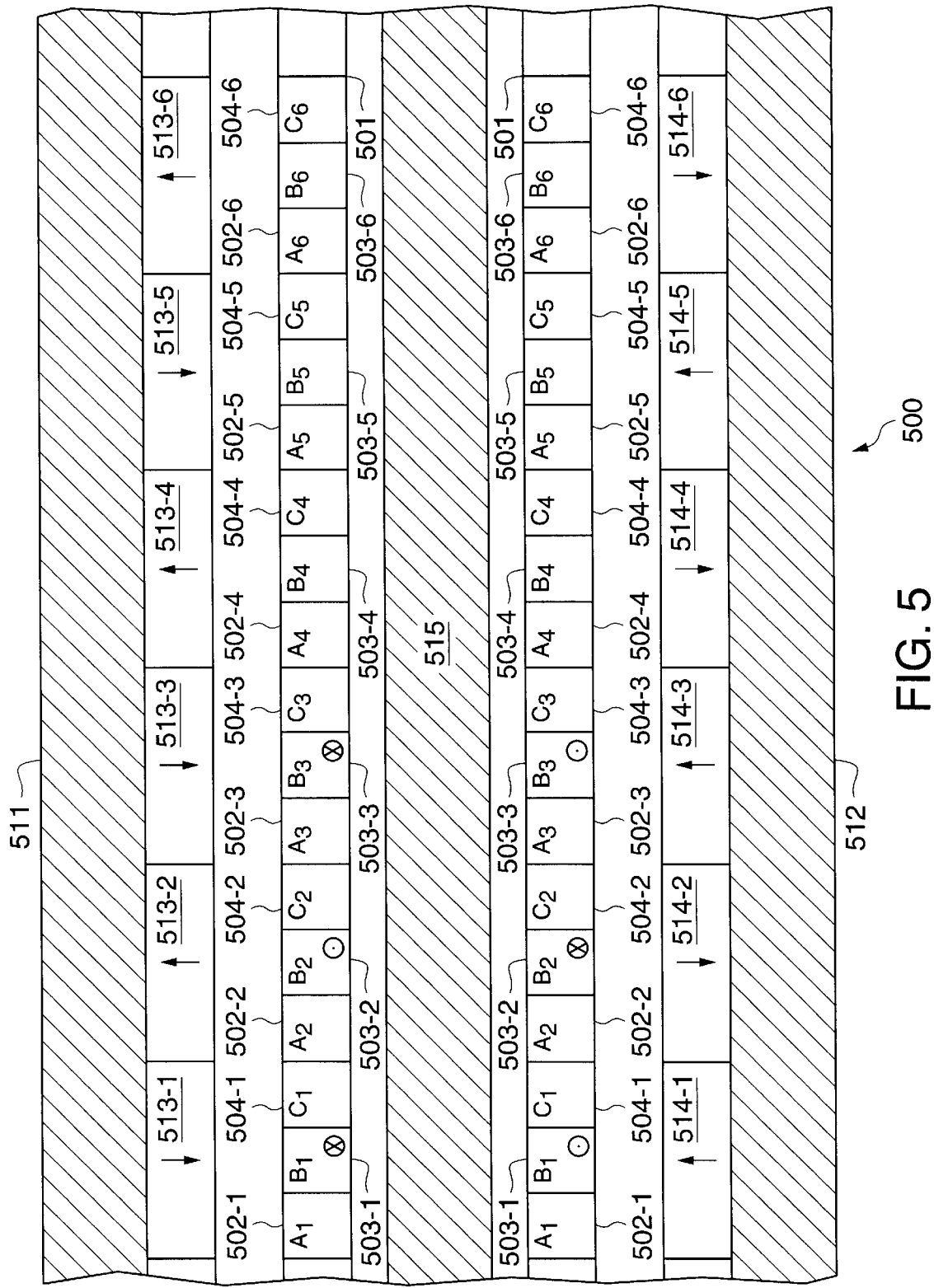
FIG. 5 shows a plan view of a linear motor according to the present invention, including three-phase commutation coils.

FIG. 5 shows a plan view of a portion of a linear motor 500. Linear motor 500 includes side rails 511 and 512 along with center pole 515. Permanent magnet strips 513-1 through 513-6 are mounted to the inside surface of side rail 511 and have alternating polarities (as indicated by the arrows associated with permanent magnet strips 513). In FIG. 5, permanent magnet strip 513-1 is magnetized with its north pole directed towards center pole 515. The adjacent permanent magnet strips, including permanent magnet 513-2, are magnetized such that its south pole is directed towards center pole 515. Permanent magnet strips 514-1 through 514-6 are mounted on the inside surface of side rail 512 opposite of permanent magnet strips 513-1 through 513-6, respectively. Permanent magnet strips 514-1 through 514-6 are magnetized to have the same polarity, i.e. the same magnetic pole directed towards center pole 515, as the corresponding one of permanent magnet strip 513-1 through 513-6.

Three-phase commutation coil 501 is arranged around center pole 515. Three-phase commutation coil 501 includes any number of sets of three coils. One embodiment includes ten (10) three-coil sets. Each coil in three-phase commutation coil 501 can have any number of turns. In one embodiment, each coil in three-phase commutation coil 501 has the same number of turns, for example, 32 turns. In FIG. 5, six (6) sets of three coils in three-phase commutation coil 501 is shown. Coils 502-1 through 502-6 carry current having phase A; coils 503-1 through 503-6 carry current having phase B; and coils 504-1 through 504-6 carry current having phase C. The three phases are separated by 120°.

In one embodiment, the length of a set of three coils is identical with the half-pitch of permanent magnet strips 513. In addition, each of the coils in three-phase commutation coil 501 is substantially identical. In that case, the current flow in one set of coils is directed opposite that of adjacent sets of coils because of the alternating polarity of the magnetic fields in adjacent permanent magnet strips. For example, in FIG. 5 the current flow in coils 503-1 and 503-3 is opposite that of coil 503-2, as indicated by a ⊕ symbol, indicating current flow into the paper, and a ⊙ symbol, indicating current flow out of the paper. Alternatively, sets of three coils in three-phase commutation coil 501 can be separated by a distance equivalent to the half-pitch of permanent magnet strips 513, in which case the current flow in each set of three coils is the same. One of ordinary skill in the art will recognize that, in FIG. 5, three-phase commutation coil 501, with current flows as indicated, will experience a force directed towards the left.

In operation, the current flow to a coil is a varying current arranged such that the maximum current flow is attained when that coil reaches the center of the magnet and is in a direction to provide a force in the desired direction of travel. For example, FIG. 6 shows a graph of current versus distance for coil 503-1 as it travels along linear motor 400. Although a sine curve is shown, the current can have any periodic shape with distance. FIG. 7 shows the currents in coils 502-1 (phase $A_1$), 503-1 (phase $B_1$) and 504-1 (phase $C_1$) as a function of time with three-phase commutation coils 501 traveling at constant velocity with respect to permanent magnet strips 513 and 514. Coils 502-2, 503-2 and 504-2 will have the opposite currents from coils 502-1, 503-1 and 504-1, respectively. Again, although the currents are shown to vary as sine waves with respect to position, any periodic function of position can be used.

As can be seen from FIGS. 6 and 7, the current in three-phase commutation coil 501 (FIG. 5) is synchronized with the position of three-phase commutation coil 501 relative to permanent magnet strips 513 and 514 by driver 312 (FIG. 3) such that the period of the current driving the motor is equal to the time required for a coil to traverse the pitch of permanent magnet strips 303 or 304. Under those circumstances, the Lorentz force on the three-phase commutation coil 501 wilt be approximately a constant.

One skilled in the art will recognize that the magnitude of the force on three-phase commutation coil 501 is proportional to $N(I_A B_A + I_B B_B + I_C B_C)$, where N is the number of three-coil sets, $I_A$, $I_B$, and $I_C$ is the current in a three-coil set having phase A, B, and C, respectively, and $B_A$, $B_B$, and $B_C$ is the magnitude of the magnetic field at the coils carrying phases A, B and C of the three-coil set, respectively. With alternating permanent magnet strips, the magnetic field B varies with sin kx, where x is the position along the motor (see FIG. 6) and k is a proportionally constant. The current in the three-coil set at phase A is arranged by driver 312 to vary proportionally to sin kx. The resulting force, therefore, is proportional to N(Isin kx B sin kx+I sin(kx+120)B sin (kx+120)+I sin(kx+240)Bsin(kx+240))=(3/2)NIB, is a constant.

Linear motors according to the present invention also reduce the inactive length of the end turns of the coils while maintaining the length of the active portions of the coil because the coils of three-phase commutation coil 501 (FIG. 5) are wound around center pole 515. Center pole 515 reverses the magnetic flux in the center of linear motor 500 so that coils of this type can be used. Coils wrapped in this manner can be wrapped with short end turns, thus reducing the fraction of inactive wire in the motor and also reducing the resistive heating losses in the coil for a given force output. In addition, center pole 515 reduces the size of magnetic air gap 405 (FIG. 4), resulting in higher magnetic flux for a given size of permanent magnet strips 513 and 514. Magnetic air gap 405 is anywhere in the motor there is not permeable material. A shorter air gap reduces the reluctance seen by permanent magnet strips 513 and 514, thus increasing the magnetic flux in air gap 405. Additionally, three-phase sinusoidal commutation where a set of three coils spans the half-pitch of permanent magnet strips 513 can theoretically produce a motion with no force ripple (i.e., the force on three-phase commutation coil is a constant).

In one embodiment of the invention, three-phase commutation coil 501 (FIG. 5) includes 10 sets of three coils. The total length of three-phase commutation coil 501 is about 240 mm. The half-pitch of permanent magnet strips 513 and 514 is about 24 mm. The length of each coil in three-phase commutation coil 501 is about 8 mm. The number of turns of 18 gauge copper wire in each coil of three-phase commutation coil 501 is 32 turns. In that case, the total resistance per phase is about 1.1 ohm. The thickness of side rails 511 and 512 is about 6 mm and the thickness of permanent magnet strips 513 and 514 is about 6 mm. Side rails 511 and 512 are about 60 mm high and are separated to yield an overall thickness of the linear motor of about 52 mm. Center pole 515 is about 12 mm wide.

In this embodiment, the magnetic field in air gap 405 (FIG. 4) averages about 0.48 tesla. In addition, the force on three-phase commutation coil 501 is about 25 Nwt per Amp. One of ordinary skill in the art will recognize the figure of merit represented by the force per root power, which is about 23.8 Nwt per sqroot (Watts). In some embodiments the air gap 405 may be reduced to yield a linear motor that is about 48 mm wide instead of about 52 mm wide.

Figure 8:
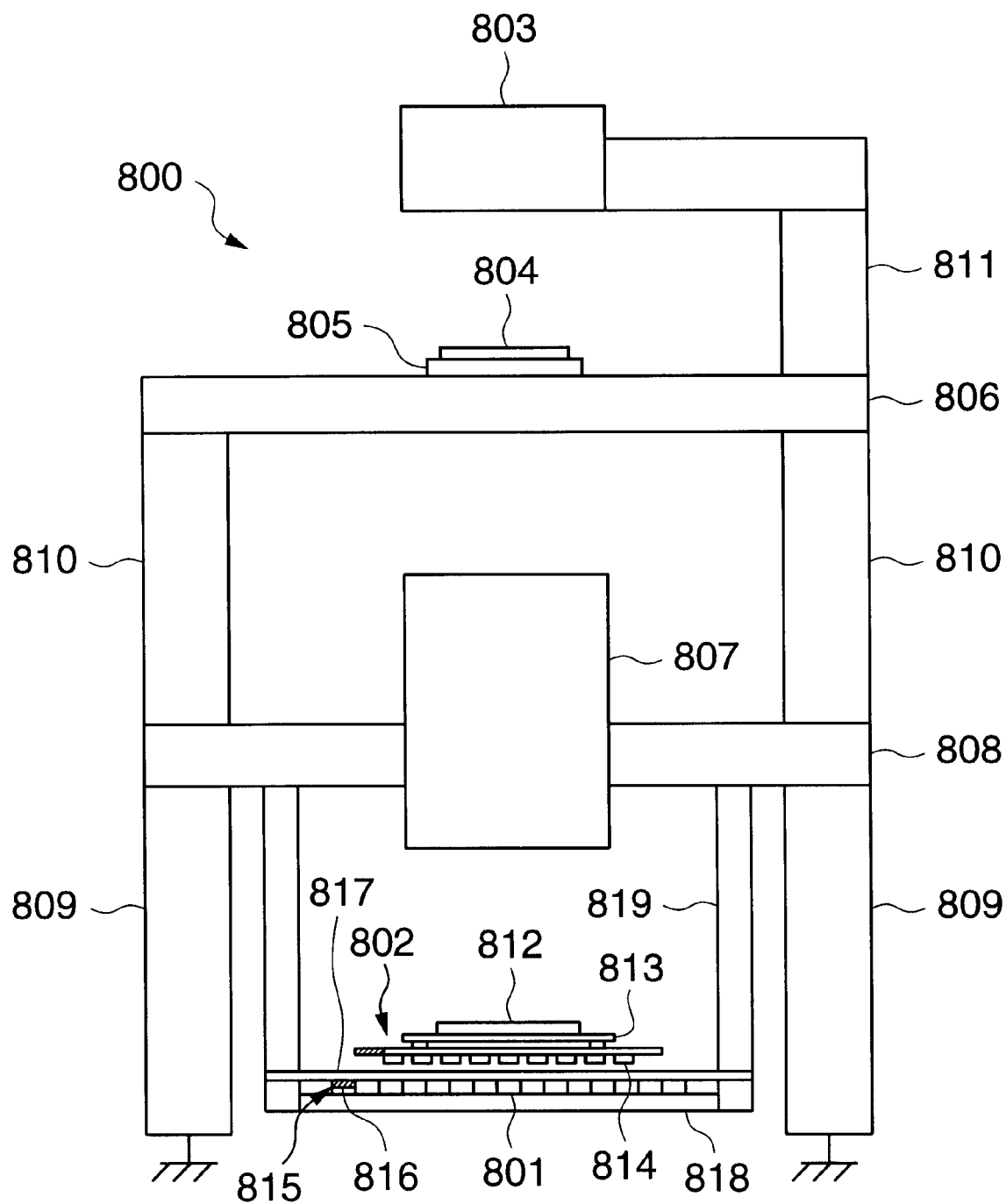
FIG. 8 is a schematic view of a photolithography system having a linear motor according to the present invention.

FIG. 8 is a schematic view illustrating a photolithographic instrument 800 incorporating a wafer positioning stage 801 driven by a linear motor 802 in accordance with present invention. Examples of photolithographic instruments that may incorporate a linear motor of the present invention are described in Nakasuji, U.S. Pat. No. 5,773,837, Nishi, U.S. Pat. No. 5,477,304, Saiki et al., U.S. Pat. No. 5,715,037, and Lee, U.S. Pat. No. 5,528,118, all of which are incorporated herein by reference in their entirety.

Referring to FIG. 8, photolithographic instrument 800 generally comprises an illumination system 803 and a linear motor 802 for wafer support and positioning. Illumination system 803 projects radiant energy (e.g. light) through a mask pattern (e.g., a circuit pattern for a semiconductor device) onto a reticle 804 that is supported by and scanned using a stage 805. Reticle stage 805 is supported by a frame 806. The radiant energy is focused through a system of lenses 807 supported on a frame 808, which is in turn anchored to the ground through a support 809. Lens system 807 is also connected to illumination system 803 through frames 808, 810, 806, and 811. The radiant energy exposes the mask pattern onto a layer of photoresist on a wafer 812.

Wafer 812 is supported by and scanned using a wafer stage 813 that is in turn supported and positioned by linear motor 802. Motor 802 comprises a moving permanent magnet array 814 and a fixed three-phase commutation coil array 815. Alternatively motor 802 comprises a moving three-phase commutation coil array and a fixed permanent magnet array. Although photolithographic instrument 800 is shown as incorporating a linear motor in which a permanent magnet array is attached to the moving stage, the photolithographic instrument can be adapted to incorporate a moving coil linear motor. Wafer stage 813 and moving magnet array 814 are supported by air bearings 816 on a top plate 817. The wafer positioning stage assembly, including a base 818, is connected to frame 808 through frame 819.

A similar linear motor can be used in reticle stage 805. Details of the implementation are not shown, but, given the disclosure herein, a person skilled in the art can implement a linear motor in reticle stage 805 without undue experimentation. It is to be understood that a photolithographic instrument may differ from the one shown herein without departing from the scope of the invention. It is also to be understood that the application of the linear motor of the present invention as disclosed herein is not to be limited to wafer processing apparatus. Any application that utilizes a translation stage, such as reticle stage 805 or a wafer positioning stage such as that formed by wafer stage 813 and linear motor 802, can utilize a linear motor according to the present invention.

Figure 9:
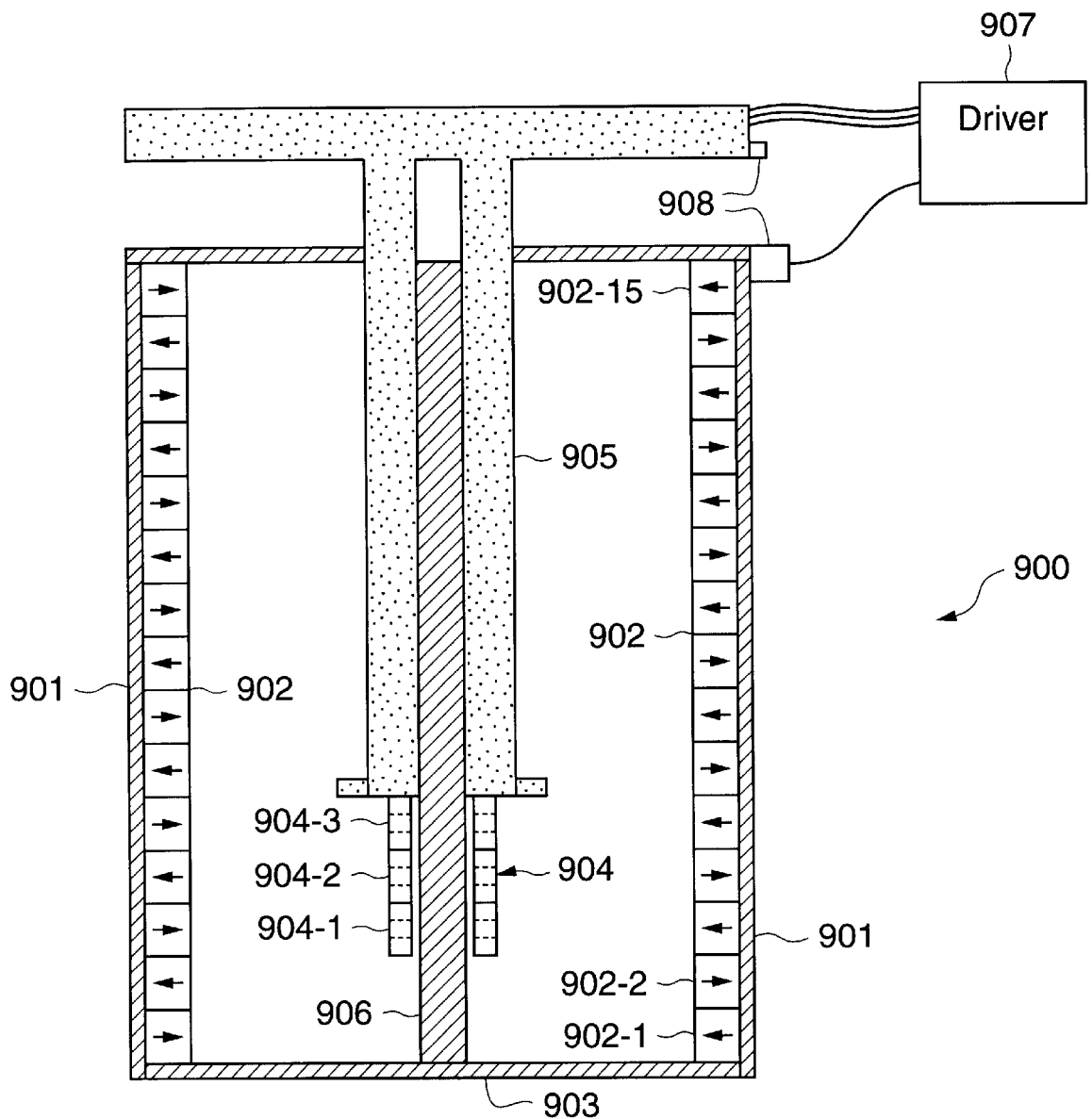
FIG. 9 shows a schematic view of an enclosed linear motor according to the present invention.

FIG. 9 shows a cross-section of a linear motor 900 that is completely enclosed. Linear motor 900 includes a single side rail 901 that is arranged to encompass the motor. Side rail 901 may be of any elongated shape open on two ends such as a cylinder. The cross section of side rail 901 may have any closed shape, such as an ellipse, rectangle, polygon, or circle (in the case of a cylindrical side rail). In FIG. 9, side rail 901 is capped on a bottom with a bottom plate 903. Center pole 906 is affixed to bottom plate 903 and extends the length of motor 900.

Permanent magnet array 902 includes individual permanent magnets 902-1 through 902-15 in FIG. 9. Generally, permanent magnet array 902 can include any number of permanent magnets. Each of the permanent magnets, i.e. permanent magnets 902-1 through 902-15, generally conforms to the shape of side rail 901 and are open around center pole 906. For example, if side rail 901 is cylindrical in shape than permanent magnets can be toroidal. As was previously discussed, permanent magnets 902 are magnetized with alternating polarity of the magnetic field (i.e., alternating permanent magnets 902 have magnetic fields directed towards side rail 901 and adjacent permanent magnets have magnetic field directed away from side rail 901.

Translation stage 905 fits over and slides along center pole 906 so that translation stage 905 is guided by and moves along the length of motor 900. In FIG. 9, translation stage 905 extends through the top of motor 900 and is translated by motor 900 from the top to a distance approximately that of the length of motor 900.

Three-phase commutation coils 904 are mounted to the end of translation stage 905 towards the bottom of motor 900. Driver 907 is electrically coupled to three-phase commutation coils 904 and supply current to three-phase commutation coils 904 in response to the position of translation stage 905 as measured by position sensor 908.

Figure 10:
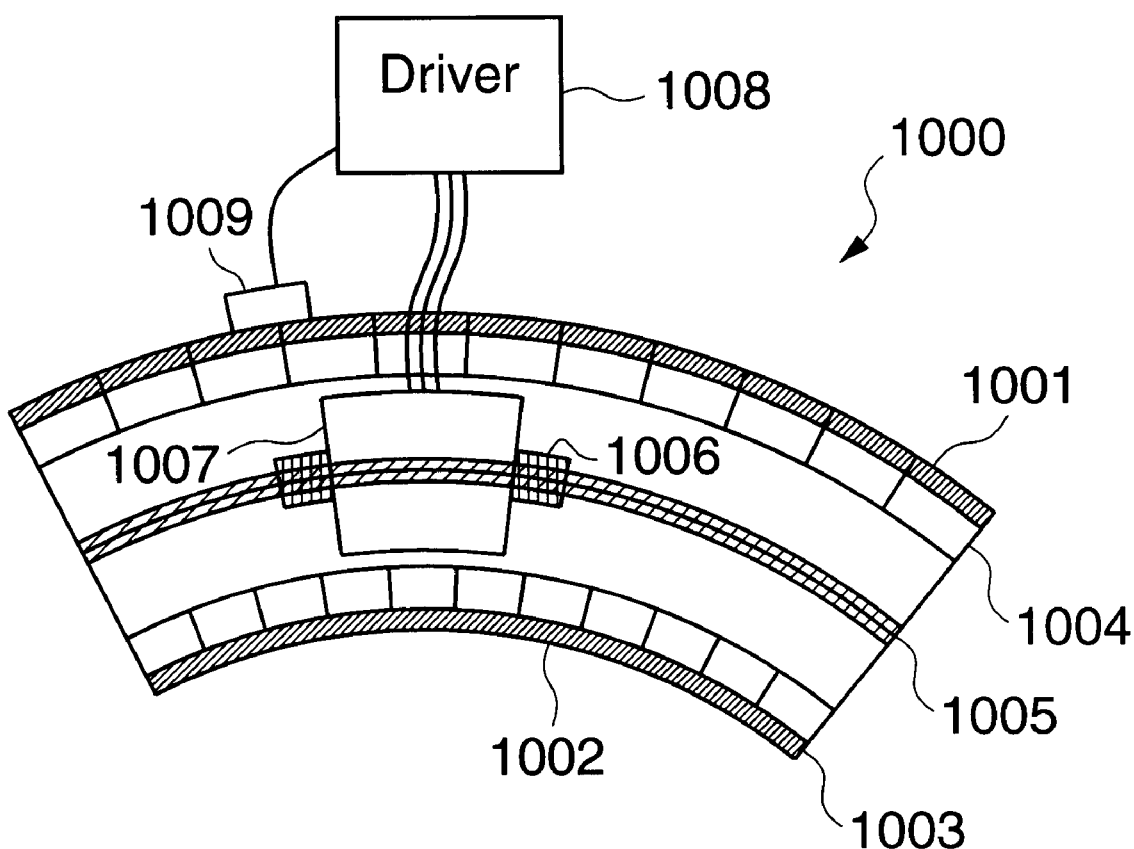
FIG. 10 shows a schematic view of a linear motor according to the present invention where the moving elements travel in a curved path rather than a straight-line path.

FIG. 10 shows a schematic of a linear motor 1000 where translation stage 1007 travels along a curve rather than along a straight line. Motor 1000 includes side walls 1001 and 1002, permanent magnet arrays 1003 and 1004, and center pole 1005 that are curved along the path of travel. Although FIG. 10 shows a linear motor that travels along a portion of an arc, in general a linear motor can be arranged so that translation stage 1007 can follow any smooth path. Three-phase commutation coils 1006 are slidably attached to center pole 1005 and translation stage 1007 is attached to three-phase commutation coils 1006. Driver 1008 supplies current to three-phase commutation coils 1006 in response to the position of translation stage 1007 as measured by position sensor 1009.

One of ordinary skill in the art will recognize that a linear motor according to this invention can have any dimensions. Other embodiments of linear motors according to this invention will have other shapes and sizes. The above described embodiments are exemplary only and are not to be considered limiting of the invention. Therefore, the invention is limited only by the following claims.

We claim:

1. A linear motor with commutation coil, comprising:
   a first magnet array;
   a second magnet array positioned opposite the first magnet array;
   a center pole positioned between the first magnet array and the second magnet array, the center pole having a longitudinal direction, the center pole being of a magnetic material;
   the commutation coil positioned around the center pole; and
   a driver electrically coupled to supply current to the commutation coil wherein the commutation coil experiences a force along the longitudinal direction by the current in the commutation coil interacting with a first magnetic field created by the first magnet array and the center pole and a second magnetic field created by the second magnet array and the center pole.

2. The linear motor of claim 1, further including a position sensor and wherein the driver supplies current to the commutation coil in response to a position of the commutation coil measured by the position sensor.

3. The linear motor of claim 1, wherein the first magnet array is attached to an inside surface of a first side rail, the second magnet array is attached to an inside surface of a second side rail, the first side rail and the second side rail are each of a magnetic material.

4. The linear motor of claim 1, wherein the first magnet array and the second magnet array each includes at least one permanent magnet, the at least one permanent magnet having a magnetization extending along its thickness, and a width extending along the center pole, the thickness of the at least one permanent magnet being along a direction extending from the first magnet array to the second magnet array.

5. The linear motor of claim 4, wherein adjacent ones of the at least one permanent magnet of the first magnet array and adjacent ones of the at least one permanent magnet of the second magnet array are magnetized with opposite polarities.

6. The linear motor of claim 5, wherein each of the at least one permanent magnet of the first magnet array is positioned opposite one of the at least one permanent magnet of the second magnet array that is magnetized with the same polarity.

7. The linear motor of claim 6, wherein the width of each of the at least one permanent magnet of the first magnet array and the at least one permanent magnet of the second magnet array is substantially the same.

8. The linear motor of claim 1, wherein the commutation coil includes at least one set of coils.

9. The linear motor of claim 8, wherein each coil in the set of coils is a flat coil.

10. The linear motor of claim 8, wherein each coil in the set of coils is wrapped such that the center pole passes through the coil.

11. The linear motor of claim 8, wherein each of the at least one set of coils includes a first coil driven with a current having a first phase, a second coil driven with a current having a second phase, and a third coil driven with a current having a third phase.

12. The linear motor of claim 11, wherein the first phase, the second phase and the third phase are severally separated by a phase shift of 120°.

13. The linear motor of claim 12, wherein a length of the at least one set of coils along the center pole is equal to a half-pitch of the first magnet array.

14. The linear motor of claim 13, wherein adjacent ones of the at least one set of coils is separated by a distance equal to a half-pitch of the first magnet array.

15. The linear motor of claim 14, wherein adjacent ones of the at least one set of coils is arranged to carry currents of opposite polarities.

16. The linear motor of claim 1, wherein the center pole is attached to, and is propelled with, the commutation coil.

17. The linear motor of claim 16, wherein the center pole is constructed from a magnetic material having low losses.

18. The linear motor of claim 1, further including a translation stage attached to the commutation coil.

19. The linear motor of claim 18, wherein the translation stage propagates in a curved path in response to the generated force.

20. A linear motor with commutation coil, comprising:
a magnet array having a plurality of permanent magnets arranged in a column, each of the plurality of permanent magnets being part of a first magnet group or a second magnet group and defining an access;
a center pole positioned to pass through the access of each of the plurality of permanent magnets of the magnet array, the center pole being of a magnetic material;
the commutation coil slideably attached to the center pole;
a translation stage attached to the commutation coil;
a position sensor that measures a position of the translation stage; and
a driver electrically coupled to provide current to the commutation coil in response to the position of the translation stage, wherein the commutation coil experiences a force along the access by the current in the commutation coil interacting with a first magnetic field created by the first magnet group of the magnet array and the center pole and a second magnetic field created by the second magnet group of the magnet array and the center pole.

21. The linear motor of claim 20, wherein each group of the plurality of permanent magnets of the magnet array are magnetized with either a first polarity, where the magnetic field is directed radially away from the center pole, or a second polarity, where the magnetic field is directed radially toward the center pole, and the plurality of permanent magnets in the magnet array is arranged such that adjacent ones of the plurality of permanent magnets are magnetized with opposite polarity.

22. The linear motor of claim 20, further including a magnetic rail attached to the magnet array, the magnetic rail being open on both ends but otherwise enclosing the magnet array.

23. The linear motor of claim 22 wherein the magnetic rail is cylindrical in shape.

24. The linear motor of claim 22 wherein the magnetic rail has a rectangular cross section.

25. The linear motor of claim 22 wherein the magnetic rail has an elliptical cross section.

26. A lithography system, comprising:
an illumination system;
a focusing lens system that focuses the illumination after it passes through a reticle;
a wafer stage that supports a wafer within the focused beam of light from the focusing lens system; and
wherein, the wafer stage includes a translation stage driven by a linear motor coupled to the wafer stage, the linear motor including:
a first magnet array;
a second magnet array positioned opposite the first magnet array;
a center pole positioned between the first magnet array and the second magnet array, the center pole having a longitudinal direction, the center pole being of a magnetic material;
a commutation coil positioned around the center pole; and
a driver electrically coupled to supply current to the commutation coil wherein the commutation coil experiences a force along the longitudinal direction by the current in the commutation coil interacting with a first magnetic field created by the first magnet array and the center pole, and a second magnetic field created by the second magnet array and the center pole.

27. The system of claim 26, wherein the translation stage is fixed to the first magnet array and the second magnet array and the commutation coil is fixed in position relative to the illumination source.

28. The system of claim 26, wherein the translation stage is fixed to the commutation coil and the first magnet array and the second magnet array are fixed with respect to the illumination source.

29. The system of claim 26, wherein the reticle is mounted on a reticle stage, wherein the reticle stage is driven on a linear motor.

30. A translation stage, comprising
a first magnet array;
a second magnet array positioned opposite the first magnet array;
a center pole positioned between the first magnet array and the second magnet array, the center pole having a longitudinal direction, the center pole being of a magnetic material;
a commutation coil positioned around the center pole; and
a driver electrically coupled to supply current to the commutation coil wherein the commutation coil experiences a force along the longitudinal direction by the current in the commutation coil interacting with a first magnetic field created by the first magnet array and the center pole and a second magnetic field created by the second magnet array and the center pole.

31. The stage of claim 30, further including a movable stage coupled to the commutation coil and wherein the first magnet array and the second magnet array is fixed.

32. The stage of claim 30, further including a movable stage coupled to the first magnet array and the second magnet array and wherein the commutation coil is fixed.

33. The linear motor of claim 20, wherein the commutation coil includes at least one set of coils.

34. The linear motor of claim 33, wherein each coil in the set of coils is a flat coil.

35. The linear motor of claim 33, wherein each coil in the set of coils is wrapped such that the center pole passes through the coil.

36. The linear motor of claim 33, wherein each of the at least one set of coils includes a first coil driven with a current having a first phase, a second coil driven with a current having a second phase, and a third coil driven with a current having a third phase.

37. The linear motor of claim 36, wherein the first phase, the second phase and the third phase are severally separated by a phase shift of 120°.

38. The linear motor of claim 26, wherein the commutation coil includes at least one set of coils.

39. The linear motor of claim 38, wherein each coil in the set of coils is a flat coil.

40. The linear motor of claim 38, wherein each coil in the set of coils is wrapped such that the center pole passes through the coil.

41. The linear motor of claim 38, wherein each of the at least one set of coils includes a first coil driven with a current having a first phase, a second coil driven with a current having a second phase, and a third coil driven with a current having a third phase.

42. The linear motor of claim 41, wherein the first phase, the second phase and the third phase are severally separated by a phase shift of 120°.

43. The linear motor of claim 30, wherein the commutation coil includes at least one set of coils.

44. The linear motor of claim 43, wherein each coil in the set of coils is a flat coil.

45. The linear motor of claim 43, wherein each coil in the set of coils is wrapped such that the center pole passes through the coil.

46. The linear motor of claim 43, wherein each of the at least one set of coils includes a first coil driven with a current having a first phase, a second coil driven with a current having a second phase, and a third coil driven with a current having a third phase.

47. The linear motor of claim 46, wherein the first phase, the second phase and the third phase are severally separated by a phase shift of 120°.

48. A method of providing a force, comprising:
providing a first periodic magnetic field region and a second periodic magnetic field region separated by a magnetic center pole, the magnetic center pole arranging that the first periodic magnetic field region is separated by the second periodic magnetic field region and wherein magnetic fields from the first periodic magnetic field region and the second periodic magnetic field region add constructively to provide a periodic magnetic field along the center pole;
generating currents in a commutation coil positioned around the center pole.

49. The method of claim 48, wherein providing a first periodic magnetic field region and a second periodic magnetic field region includes arranging a first array of permanent magnets such that alternating ones of the first array of permanent magnets have opposite polarity and arranging a second array of permanent magnets such that alternating ones of the second array of permanent magnets have opposite polarity.

50. The method of claim 48, wherein generating currents in a commutation coil includes
providing a three-phase coil having at least one set of three coils arranged along the center pole;
measuring the position of the at least one set of three coils; and
providing current to each of the at least one set of three coils in response to the position.

51. The method of claim 50, wherein the set of three coils includes flat coils.

52. The method of claim 50, wherein the set of three coils are wound around the center pole.

53. A lithography system, comprising:
an illumination system that irradiates radiant energy; and
a translation state that carries an object disposed on a path of said radiant energy, the translation stage including
a first magnet array,
a second magnet array positioned opposite the first magnet array,
a center pole positioned between the first magnet array and the second magnet array, the center pole having a longitudinal direction, the center pole being of a magnetic material,
a commutation coil positioned around the center pole; and
a driver electrically coupled to supply current to the commutation coil wherein the commutation coil experiences a force along the longitudinal direction by the current in the commutation coil interacting with a first magnetic field created by the first magnet array and the center pole, and a second magnetic field created by the second magnet array and the center pole.

54. The system of claim 53, wherein the first magnet array and the second magnet array each include a plurality of permanent magnets arranged with alternating polarity.

55. The system of claim 53, wherein the commutation coil includes at least one set of coils.

56. The system of claim 55, wherein the at least one set of coils includes flat coils.

57. The system of claim 55, wherein the at least one set of coils is wound around the center pole.

58. The system of claim 55, wherein each of the at least one set of coils includes a first coil driven with a current having a first phase, a second coil driven with a current having a second phase, and a third coil driven with a current having a third phase.

* * * * *